United States Patent [19]
De Vaul

[11] 3,806,933
[45] Apr. 23, 1974

[54] PULSED HYPERBOLIC RECEIVING SYSTEM
[76] Inventor: Wayne E. De Vaul, 2055 N.W. 25th St., Corvallis, Oreg. 97330
[22] Filed: July 14, 1972
[21] Appl. No.: 272,036

[52] U.S. Cl. .............................................. 343/103
[51] Int. Cl. .............................................. G01s 1/24
[58] Field of Search .................................... 343/103

[56] References Cited
UNITED STATES PATENTS
3,422,433    1/1969    De Vaul .............................. 343/103

Primary Examiner—Maynard R. Wilbur
Assistant Examiner—Richard E. Berger
Attorney, Agent, or Firm—Klarquist, Sparkman, Campbell, Leigh, Hall & Whinston

[57] ABSTRACT

A loran receiver automatically selects loran pulse signals of a given repetition rate and displays a numerical output indicative of the loran line-of-position. A double rate reading is taken with respect to the loran signal pulse period, i.e., twice during each loran period, by measuring from both the time of reception of master and slave pulse signals to the loran half-period markers associated with the respective opposite pulse signal.

12 Claims, 9 Drawing Figures

PULSED HYPERBOLIC RECEIVING SYSTEM

BACKGROUND OF THE INVENTION

In a hyperbolic navigation system such as a loran system, a pair of pulse signals are transmitted at a predetermined repetition rate from spaced locations. A "master" station transmits uniformly spaced pulses, and several hundred miles away a "slave" station transmits a corresponding series of pulses which are accurately synchronized with those of the master station. The position of a ship or aircraft can be determined by accurate measurement of the difference in time of a reception between the master and slave pulses, wherein a given time difference locates the craft along a given hyperbolic "line-of-position". Reception of a second pair of loran signals from stations geographically remote from the first pair of used in establishing a second hyperbolic line-of-position for intersecting the first mentioned line at the location of the craft.

Many pulsed hyperbolic receiving systems have been slow in operations and have required a certain amount of skill on the part of the operator in selecting and correctly utilizing a loran signal pair. Although automatic systems have been employed, they tend to be slow in operation because of the time taken in initially distinguishing the master pulse signal from the slave pulse signal.

In accordance with my prior Pat. No. 3,422,433 granted Jan. 14, 1969 and entitled "Loran Receiving System", a rapid determination of line-of-position output is secured through measurement of the delay between the half-period point of one loran signal of a pair and the remaining pulse signal of a pair, regardless of the order of pulses selected. However, such automatic apparatus makes essentially one measurement per loran pulse period. It is desired to provide greater numbers of valid measurements per unit of time.

SUMMARY OF THE INVENTION

In accordance with the method and apparatus of the present invention, a pair of periodic pulse signals is selected according to repetition rate. Measurement is continuously and alternately made from the half-period point associated with each one of said pulse signals to the remaining pulse signal. Thus, measurement is made from the half-period point associated with a master pulse to the time of the slave pulse, followed by measurement of the time from the half-period point associated with the slave pulse to the time of the master pulse, with the two measurements alternating to provide information at a more rapid rate than heretofore supplied, i.e., two measurements are supplied during each pulse period. Alternatively, measurement is taken consistently from the half-period point of the master pulse period to the slave pulse, or from the half-period point of the slave pulse period to the master pulse. In any case, an automatic output is supplied and no manual or initial selection of the master and slave pulses is required in operation of the apparatus.

It is accordingly an object of the present invention to provide an improved pulsed hyperbolic receiving system for automatically supplying a line-of-position reading.

It is another object of the present invention to provide an improved pulsed hyperbolic receiving system for rapidly and automatically providing a numerical output for navigational purposes.

It is a further object of the present invention to provide an improved pulsed hyperbolic receiving system for automatically supplying line-of-position information at a more rapid rate than heretofore attained.

It is another object of the present invention to provide an improved pulsed hyperbolic receiving system in which a consistent measurement is made between a master pulse and a slave pulse in predetermined order wherein no manual or initial determination of pulse order is required.

It is a further object of the present invention to provide an improved pulsed hyperbolic receiving system which is rapid in operation and reliable in output accuracy.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DETAILED DESCRIPTION

Figure 1:
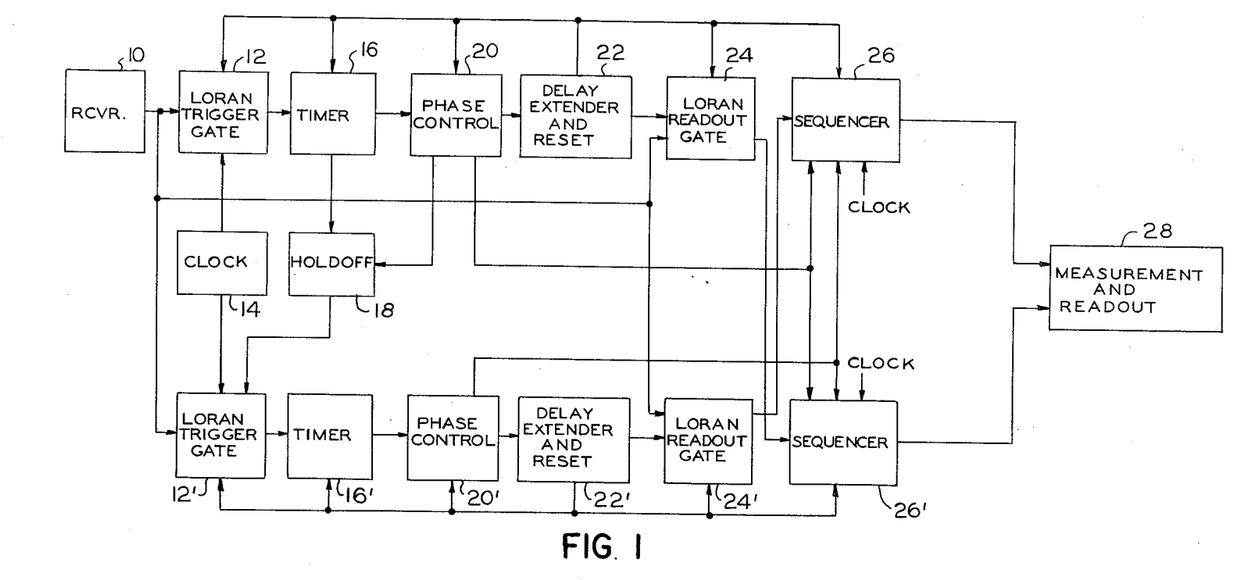
FIG. 1 is a block diagram of a pulsed hyperbolic receiving system according to the present invention.

Referring to the drawings and particularly to FIG. 1, a pulsed hyperbolic receiving system includes in the case of a specific embodiment a loran receiver 10 tunable to receive loran signal pairs at predetermined selected frequencies. The output of the receiver comprising loran trigger pulses is supplied to a main channel, starting with loran trigger plate circuit 12, and a complement channel, starting with loran trigger gate circuit 12' and referred to by employing primed reference numerals. Assuming a given loran trigger pulse of a master-slave pulse pair is gated by loran trigger gate 12, a counting cycle is initiated in main timer 16. When loran trigger gate 12 is operated, repetitive output pulses from clock pulse generator 14 are applied to timer 16 wherein such clock pulses are counted and certain output signals are generated at predetermined times after a loran input trigger pulse. Halfway through a given loran period, to which main timer 16 is preset, main phase control 29 provides a half-period marker signal, and slightly before the conclusion of such period, delay extender and reset circuit 22 is actuated for resetting loran trigger gate 12 as well as the remainder of the circuitry. Consequently, loran trigger gate 12 is reset to receive the next consecutive trigger at the end of the loran period chosen by the setting of timer 16. In effect, the circuitry comprising element 12, 16, 20 and 22 will "lock on" to a repetitive loran pulse having a given repetition rate, and the circuitry including means 12, 16, 20 and 22 comprises the means for selection of a loran signal at a given repetition rate.

At the conclusion of each loran period, as ascertained by the circuitry just described, delay extender and reset circuit 22 opens loran readout gate 24 for a period of four microseconds, during which the consecutive next selected loran pulse is passed by a "program gate" supplied loran readout gate circuit 24. This gated loran pulse is applied to sequencer 26' in the complement channel, in combination with the half-period marker signals from phase control circuits 20 and 20', for purposes which will hereinafter more fully appear. Similarly, the output of loran readout gate 24' in the complement channel is applied to main sequencer 26, in combination with the half-period marker signals from phase control circuits 20 and 20'. The sequencers 26 and 26' gate clock pulse signals to measurement and readout circuit 28 for display of a line-of-position number corresponding to a line-of-position on a loran navigational chart.

The complement channel, comprising elements referred to employing primed reference numerals, operates in a substantially similar manner to the main channel circuitry described above. Thus, loran trigger gate 12' is responsive to a loran trigger pulse and gates clock pulses from clock pulse generator 14 into timer 16' wherein such clock pulses are counted to provide output indications at predetermined times after the received loran trigger pulse. Timer 16' is preset to provide output pulses after precisely the same time delay period as timer 16. At a loran half-period after gate 12' responds to a trigger pulse, phase control circuit 20' supplies a half-period marker signal for reasons which will hereinafter more fully appear. Then, just before the conclusion of the selected loran period after the input trigger pulse, delay extender and reset circuitry 22' resets the complement channel including loran trigger gate 12' rendering the same responsive to the next consecutive loran trigger pulse having a predetermined repetition rate.

A principal difference in function of the complement channel circuitry relates to the use of holdoff circuit 18 operated by timer 16 for inhibiting loran trigger gate 12' at times corresponding to operation of loran trigger gate 12. Thus, if loran trigger gate 12 is responsive to a loran master pulse of a given pulse pair and the main channel is locked on to this master pulse, loran trigger gate 12' will be inhibited from responding to the same master pulse. Consequently, loran gate 12' will be able to respond to the slave pulse of the pulse pair. Alternatively, if the main channel should lock on a loran slave pulse of a given pulse pair, the complement channel will lock on the master pulse.

Figure 2:
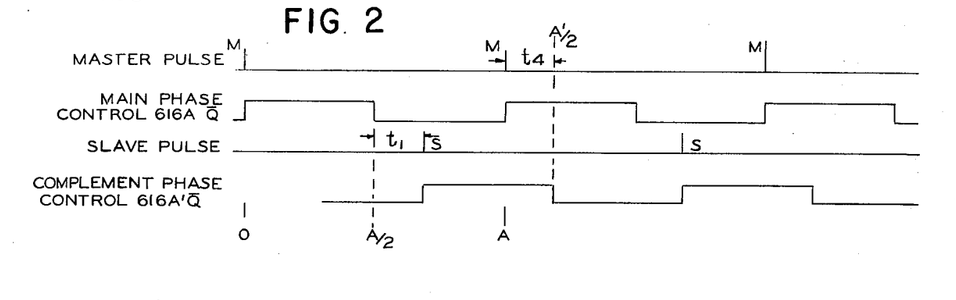
FIGS. 2 and 3 are waveform charts illustrating operation of the pulsed hyperbolic receiving system according to the present invention.
Figure 3:
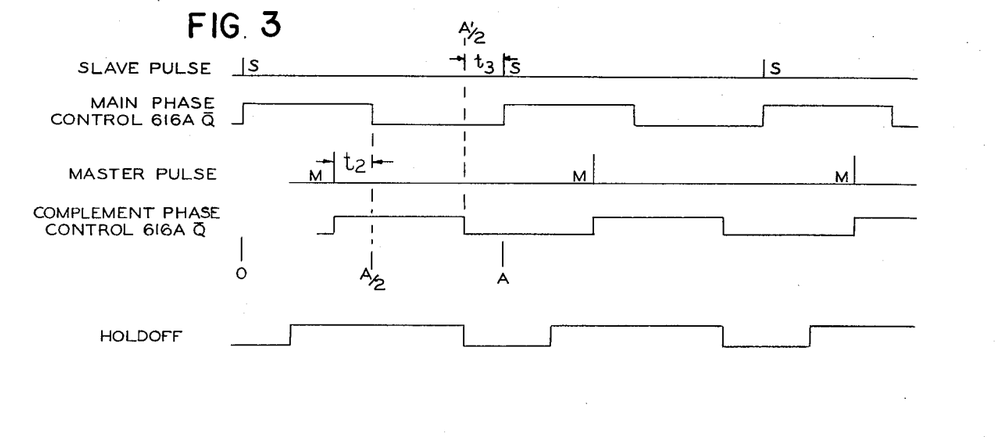

Operation of the FIG. 1 circuitry will be further described with reference to FIGS. 2 and 3, depicting master pulses M and slave pulses S having a given repetition rate, and further depicting main phase control and complement phase control outputs, derived from phase control circuits 20 and 20', respectively, in FIG. 1. The selected loran pulse period is defined as "A". FIG. 2 illustrates the situation wherein the main channel has locked on to a master pulse of a loran pair and the complement channel is locked to a slave pulse of the same pair. For providing an output indicative of the line-of-position, it is desired to measure a time period, $t_1$, between the half-period point at A/2 of the master pulse period and the occurrence of the slave pulse. Main phase control circuit 20 provides the indicated rectangular waveform, going high substantially at the start of the loran period, i.e., just slightly before reception of the master pulse, and going low at the half-period time thereafter. The main phase control output, and particularly a signal corresponding to the down-going half-period point, is supplied as a marker signal to sequencer 26 in FIG. 1. Sequencer 26 also receives the output of loran readout gate 24' which in this case consists of the slave pulse passing through the program gate of loran readout circutry 24'. Sequencer 26 is effective to gate clock pulses starting at A/2 and ending at the reception of the slave pulse. The stream of pulses thus produced is counted and a corresponding line-of-position number displayed in measurement and readout circuitry 28. The measurement is repeated for each loran pulse period.

The situation wherein the main channel is locked on to the slave pulse and the complement channel is locked on to the master pulse as illustrated in FIG. 3. The time $t_2$ will be measured and will result in the same delay or line-of-position output as indicated by the time $t_1$ in FIG. 2. When a master pulse is passed by the program gate provided by loran readout gate circuitry 24', sequencer 26 is caused to initiate gating of the clock pulses to measurement and readout circuitry 28. Then, phase control circuit 20 supplies an indication at the half-period point A/2 which, when applied to sequencer 26, is effective for concluding the stream of clock pulses provided measurement and readout circuitry 28. Circuitry 28 counts the pulses and displays the line-of-position number.

Further, in accordance with the present invention a doubly rapid readout is secured in that not only is the time period measured between the loran half-period points of the main phase control waveform and the respective loran pulse, but also the time period is measured between the half-period points of the complement phase control waveform and a respective loran pulse. Therefore, twice as many valid inputs are supplied to measurement and readout circuitry 28 resulting in a more accurate and consistent output. At times between measurements of $t_1$, hereinbefore described with reference to FIG. 2, further measurements, $t_4$, are accomplished by measurement and readout circuitry 28. During the time period $t_4$ in FIG. 2, sequencer 26' is responsive to the master pulse as gated by the program gate of loran readout gate circuitry 24 for initiating a stream of clock pulses fed to the measurement and readout circuitry. Then, at the half-period point, A'/2, of phase control circuit 20', the stream of clock pulses is interrupted with the accumulation thereof in the measurement and readout circuitry being indicative of the loran line-of-position information. Alternatively, assuming the FIG. 3 situation, wherein the main channel is locked on to the slave pulse and the complement channel is locked on to the master pulse, the half-period indication from phase control circuit 20' initiates operation of sequencer 26' to supply a stream of clock pulses to measurement and readout circuitry 28. Then, when a slave pulse is gated by a loran readout gate circuitry 24, sequencer 26' responds in dicontinuing such stream of clock pulses. The clock pulses during the interim are counted in measurement and readout circuitry 28 for thereby providing measurements $t_3$ between and alternating with the $t_2$ measurements.

Thus, the maximum use is made of received loran information, for rapidly supplying an accurate and automatic numerical readout display. It will be noted that no selection of loran pulses by an operator is required.

In the system as described, a double readout rate is automatically accomplished, but it will be apparent that the system according to the present invention can be utilized in another advantageous mode of operation. Thus, sequencers 26 and 26' as well as measurement and readout circuitry 28 may be arranged such that sequencer 26 provides an effective output stream of clock pulses in response to a signal from phase control 20 followed by a clock-pulse-concluding signal from loran readout gate 24', thus indicating the time period $t_1$ starting with the half-period point after the master pulse and concluding with the slave pulse. Also, sequencer 26' may in effect supply a series of clock pulses initiated by phase control circuit 20' and concluded by the loran slave pulse as passed by loran readout gate 24 during time $t_3$. In such manner, the circuitry is responsive to the period of time starting with the loran half-period point after the main pulse and ending with the slave pulse. Alternatively, it is readily seen the circuitry can be switched always to respond to a sequence starting with a master pulse and ending with the half-period after a slave pulse. In the case of either the single or double readout, no initial selected need be made by either an operator or automatic circuitry for determination of and selection of the master pulse. In the case of the double rate readout, the effective time difference between master and slave pulses is is measured twice each loran period. In either case, the time delay is automatically indicated by measurement and readout circuitry 28.

Figure 4A:
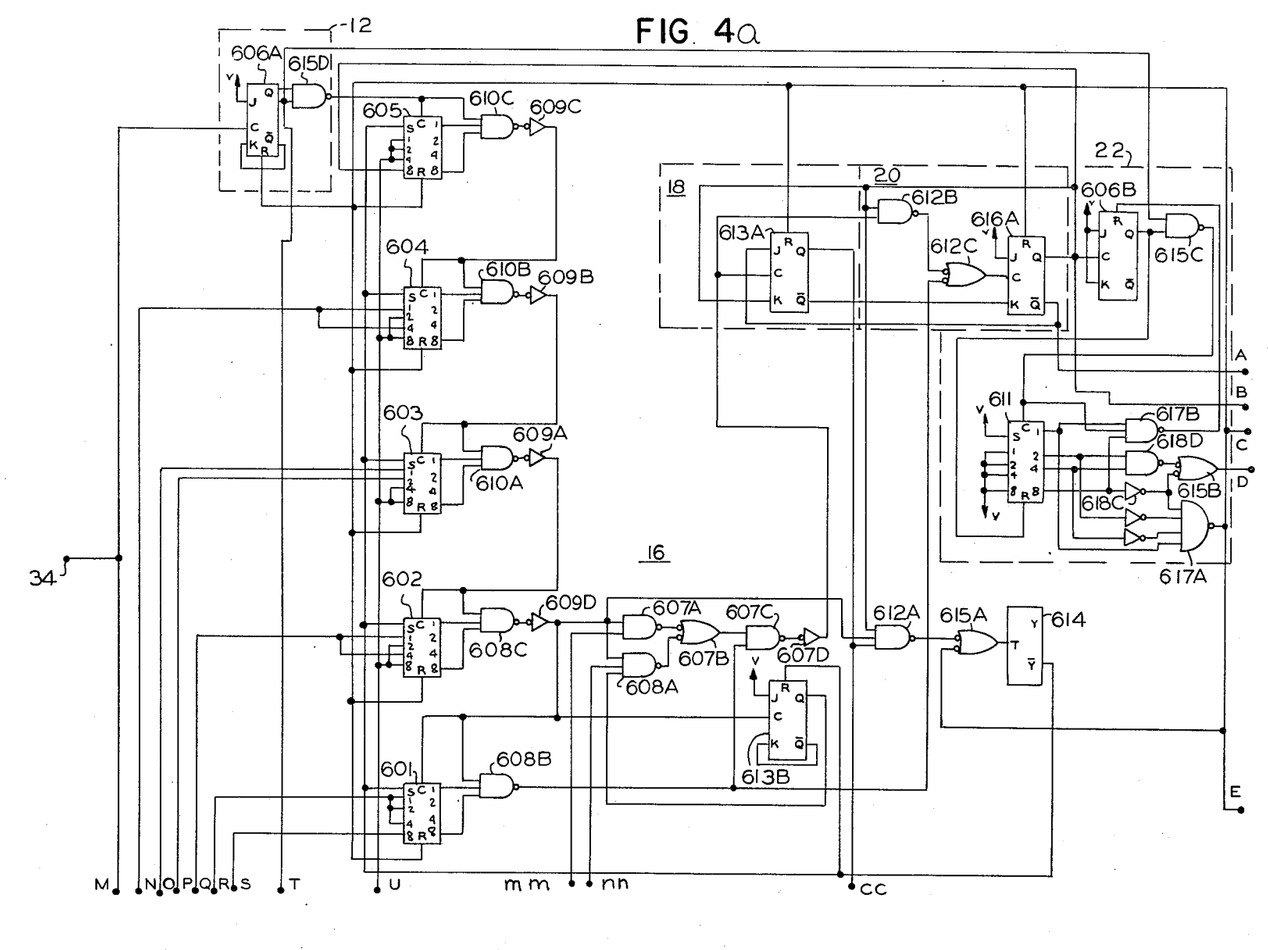
FIGS. 4a through 4d comprise a schematic diagram of the system according to the present invention.

Referring to FIGS. 4a, 4b, 4c and 4d, the circuit according to the present invention is illustrated in shematic diagram form. The portions of the schematic diagrams shown in the individual figures are interconnected as indicated by letters A, B, C, etc. Thus, terminal A in FIG. 4a is connected to terminal A' in FIG. 4c, terminal M in FIG. 4a is connected to terminal M' in FIG. 4b, and so on. The main channel circuitry, i.e., from loran trigger plate 12 through measurement and readout means 28, will be principally considered, it being understood the complement channel, beginning with loran trigger plate 12', is substantially identical and operates in a similar manner. Corresponding elements in the complement channel are again referred to employing primed reference numerals.

The output of a loran receiver in pulse form is connected to terminal 34 in FIG. 4a wherein such loran receiver may comprise, for example, the loran receiving system set forth in my copending application Ser. No. 223,652 filed Feb. 4, 1972 and entitled "Method and Apparatus for Loran Reception," Terminal 34 is connected to loran trigger gate 12, and specifically to the clock input of J-K flip-flop 606A, the Q output of which enables nand-gate 615D. Thus, when a loran pulse is received, flip-flop 606A changes stage and holds its gate-enabling state until reset. Meanwhile, clock pulses at a 1 megahertz rate from clock pulse generator 14 will produce corresponding negative-going pulse outputs via gate 615D for application to timer 16.

Timer 16 principally comprises a decimal counter composed of decades 601, 602, 603, 604 and 605, wherein the clock input of decade 605 receives the output of gate 615D. Each decade is initially reset to zero from terminal R, and may then be preset, upon application of an S input, to a preset value as determined by switches 30 and 32 in FIG. 4b. The counter is a ripple carry container and the output of a first storage, decade 605, is connected to the clock input of the second stage, decade 604, via nand-gate 610C and inverting amplifier 609C. Thus, when decade 605 changes from a nine count to a zero count, nand-gate 610C is operated from an actuated condition to a nonactuated condition such that a trigger is provided to the clock input of decade 604 via amplifier 609C. Assume the eight and one inputs of a decade are up and nand-gate 610C is operated. When the clock input to the decade goes low, causing eight and one outputs of the decade to go low as the decade makes a transition from nine to zero, all inputs of gate 610C drop and a low-going transition will be applied as an input to the clock terminal of the next decade. Gates 610B, 610A and 610C, as well as inverting amplifiers 609B, 609A and 609D, function in the same manner for carry propagation with respect to the subsequent decades.

The counter is preset in accordance with the setting of switches 32 and 30, which select the basic and specific pulse recurrence rates. The basic loran rate is selected by switch 32 and the specific rate by switch 30. For the switching position shown, a basic H0 recurrence rate of 33⅓ pulses per second is selected, or a pulse period of 30,000 microseconds. For this switch setting, the counter, when preset, willbe loaded with the complement of the loran pulse half-period. Thus, for a five decade counter, the complete count is 100,000, and the H half-pulse period is 15,000. Consequently, the counter, when preset, will be loaded with the value of 85,000. When the loran pulse input is received, operating loran trigger plate 12, the counters 601–605 will count from 85,000, and arrive at a zero count at the loran half-period, A/2.

It will be seen for the particular switch setting illustrated, a positive five volts is applied via switch 32, and connections Q' and Q, to the one and four presetting inputs of decade 602. Similarly, a positive 5 volts is applied via switch 32, and connections S' and S, to the eight presetting input of decade 601, while decades 603, 604 and 605 are preset to zero in this switching position to establish the aforementioned loading of 85,000.

Figure 4B:
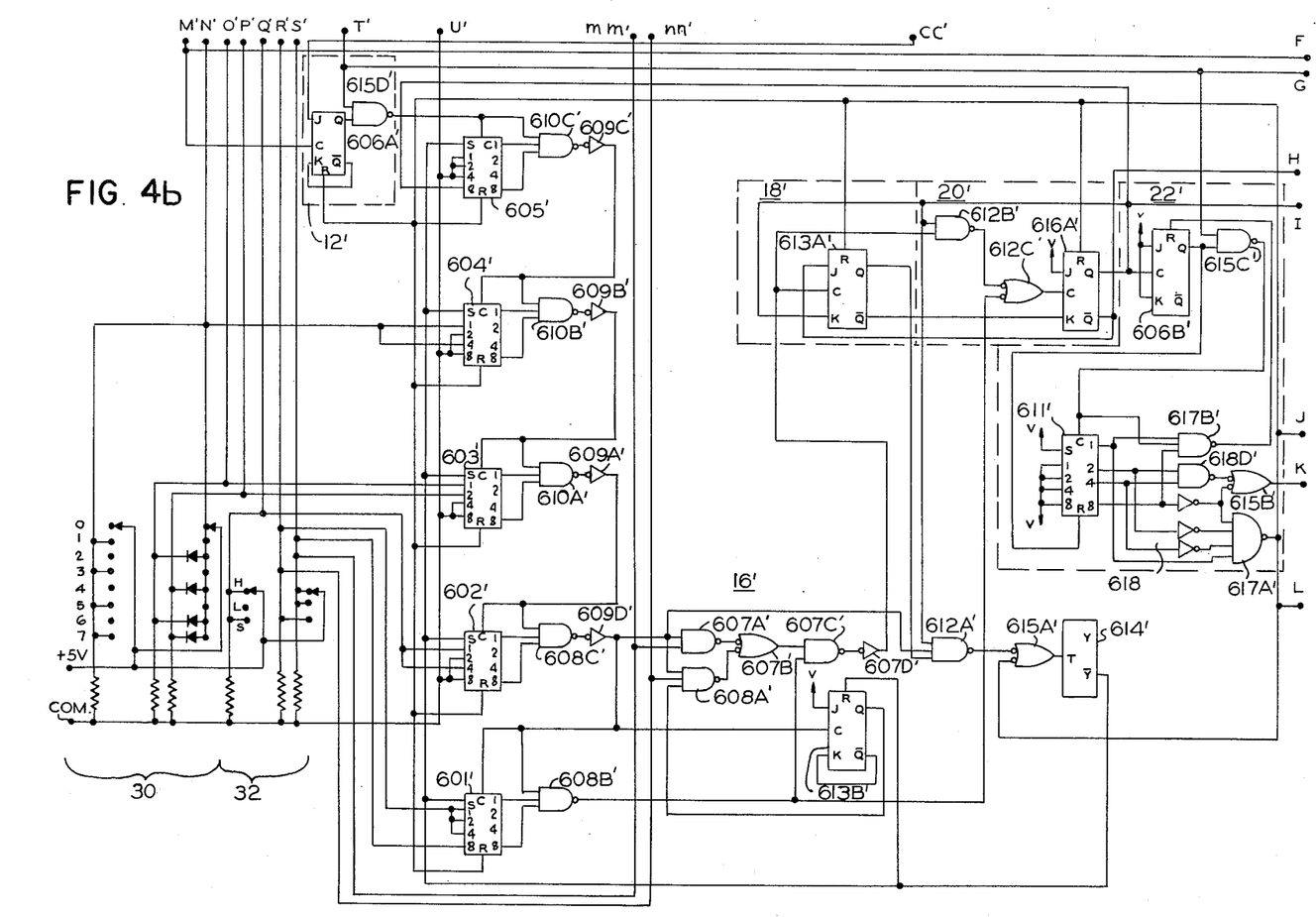

Designating the time when gate 12 is triggered by a loran pulse as $t_0$, a first output is derived from the counter at $t_0+5$ milliseconds, at which time it is desired to change states of the holdoff ciruit 18 from a state where loran trigger gate 12' (in FIG. 4b) is inhibitied, to a state where trigger gate 12' is enabled. Note that for the H basic rate, nand-gate 607A is enabled by switch 32 while nand-gate 608A is disabled. When the counter arrives at 90,000, decade 602 will change from a nine count to a zero count, producing a negative-going transition at the output of amplifier 609D. This transition is coupled via gates 607A, 607B and 607C, as well as amplifier 607D, and is applied to the clock input of J-K flip-flop 613A. At this time, as the flip-flop's J input is high and its K input is low, on the negative-going transition applied to flip-flop's clock input, the flip-flop changes states and the Q output thereof rises. Consequently, flip-flop 606A' in FIG. 4b is enabled via connection CC-CC' at this time as indicated.

for example, by the first positive-going transition of the holdoff waveform in FIG. 3. Thus, loran trigger gate 12' in the complement circuitry can accept a loran pulse as a trigger for the period of the next following 20 milliseconds or the duration of the relative positive portion of the holdoff waveform in FIG. 3.

The main timer counter in FIG. 4a continues to count for carrying out the entire preset count to zero at time $t_0+15$ milliseconds, or A/2. At such time, nand-gate 608B produces a positive-going transition, inverted through nor-gate 612C to provide a negative-going transition input to the clock input terminal of main timer phase control flip-flop 616A. Therefore, main timer phase control flip-flop 616A changes states, with the Q output thereof rising and the $\overline{Q}$ output dropping. The $\overline{Q}$ output of flip-flop 616A is labeled "Main Phase Control" in FIGS. 2 and 3. This concludes "phase one" of circuit operation which extends from zero to A/2, corresponding to the positive-going portion of the main phase control waveform in FIGS. 2 and 3. It is necessary to inhibit the output of amplifier 609D at this time (A/2), this being accomplished by inhibiting gate 607C. It will be noted that the two inputs of gate 607C will be opposite in polarity at time A/2 and the transition immediately therebefore.

The main timer counter continues to count without reset, i.e., the counter proceeds past the state wherein all the decades 601–605 are in the zero state, an starts counting in "phase two" of circuit operation, extending from A/2 to A. The count of the main timer counter continues until $t_0+25$ milliseconds, or until A/2+10 milliseconds. Amplifier 609D then provides a pulse to the input of gate 607A and to one input of gate 612A. Flip-flop 613A is toggled at this time. Since the J input of flip-flop 613A is low, being derived from the $\overline{Q}$ output of phase control flip-flop 616A, and since the K input is high, being derived from the Q output of phase control flip-flop 616A, the Q output of flip-flop 613A goes low, thus providing the negative-going transition of the holdoff waveform, indicated in FIG. 3, for starting a holdoff period. Consequently, loran trigger gate 12' in FIG. 4b will be inhibited for 10 milliseconds, i.e., the holdoff period.

The main timer counter again reaches a zero through a first four decades at time $t_0+25$ milliseconds or at A/2+10 milliseconds. One of the inputs of gate 612A is the Q output of phase control flip-flop 616A which is high in phase two. A second input to gate 612A is the Q output of flip-flop 613A which will still be high at the time under consideration. The third input to gate 612A is the output of amplifier 609D, so when the pulse output of amplifier 609D occurs for starting the holdoff, the negative-going pulse results at the output of gate 612A. Such pulse is inverted by nor-gate 615A and the conclusion thereof triggers one-shot multivibrator 614, the latter producing a negative-going pulse at its $\overline{Y}$ terminal. The last mentioned terminal is connected to the "set" inputs of decades 601–605, and consequently these decades will be preset to a desired value. However, this preset value will be different from the preset value occurring at the start of phase one. The interval to which the counter is set is the required interval until the end of phase two. A count of eight is preset in the units decade 605 at this time (rather than zero in the units decade) in order to provide for operation of the delay extender and reset circuit 22 for a period of approximately 10 microseconds at the end of phase two.

The high level for the extra eight input of decade 605 is derived from the Q output of phase control flip-flop 616A. Otheriwse, the preset for the main timer counter is derived from switches 32 and 30 as in the case of phase one. Consequently, considering only the lower order four stages or decades of the counter which are employed in phase two, the number preset therein will be 5008 for the switch setting illustrated. The counter continues to count from this number, and when decade 602 makes the transition from nine to zero, an output is produced by amplifier 609D and the output is gated via gates 607A, 607B and 607C as well as amplifier 607D and is applied to gate 612B. An input is also applied to flip-flop 613A, but is of no importance at this time. The output of gate 612B is inverted by gate 612C and coupled to the clock input of phase control flip-flop 616A. The Q output of phase control flip-flop 616A then goes low, and its $\overline{Q}$ output goes high marking nearly the end of phase two, or nearly the time A as indicated by the main phase control waveform in FIGS. 2 and 3. It will be noted that the $\overline{Q}$ output from flip-flop 613A is applied to the K input of phase control flip-flop 616A. The flip-flop 616A output at terminal Q provides a high-to-low level transition at the clock input of flip-flop 606B in delay extender and reset circuit 22. The Q output of flip-flop 606B rises, and supplies one input to clock-gate 615C which also receives an input from clock pulse generator 14. Consequently, clock pulses are gated via gate 615C to the input of decade counter 611. Decade counter 611 starts from zero count, and eventually resets flip-flop 606B in the ninth count of decade counter 611, i.e., after approximately 9½ microseconds. This resetting is accomplished by nand-gate 617B receiving the one and eight outputs of counter 611 as well as the direct decade clock input from gate 615C. Thus, a high-to-low transition is produced, the output of gate 617B being connected to the reset terminal of flip-flop 606B.

Meanwhile, other gating circuitry receiving the outputs of counter 611 produces outputs as follows. The first "one" output from counter 611, in the absence of a two, four or eight output, energizes gate 617A causing the same to produce a negative-going reset pulse for the duration of the "one" output of the counter 611. This output of gate 617A is employed as the main reset for phase control flip-flop 616A, holdoff flip-flop 613A, the loran trigger gate flip-flop 606A, and all the main counter decades. Moreover, this reset is applied to nor-gate 615A for presetting the counter, as hereinafter described, and is further applied to the sequencer circuits as indicated. Since the flip-flop 606A is reset, it will be seen that trigger gate 12 will be inhibited from transmitting clock pulses until another loran trigger input is received. When the counter 611 reaches the count of six, gate 618D is enabled, producing an energizing input for gate 615B, and this energizing input will be retained for 2 microseconds, i.e., through the count of seven. When the counter 611 reaches the count of eight, the gate 615B is energized for nearly another 2 microseconds from the counter's eight output. Thus, the output of gate 615B will be up for nearly 4 microseconds, providing a loran pulse program gate for loran readout gate circuit 24. The counting is the range such that this program gate output of gate 615B straddles the time, A, or the end of the selected loran period. The program gate is applied as a J input of flip-flop 616B of loran readout gate 24, the latter flip-flop receiving the loran input trigger as a clock input. If the loran trigger pulse again occurs after one loran period and within the program gate, then flip-flop 616B changes states and maintains the state wherein the Q output is high for substantially the next loran period or until reset on its terminal R from the next output from gate 617A. The output from flip-flop 616B is indicative of lock-on by the main channel circuitry.

It will be noted that the main timer counter was preset by eight additional counts for the "short count" carried out in phase two, while the delay extender circuitry 22 added 6 microseconds to the timed interval before a program gate is produced. The net result is that the program gate starts 2 microseconds before the end of the loran period at A, as above noted. Meanwhile, loran trigger gate 12 has been reset so that it can be responsive to the next lorgan trigger for reinitiating a phase one count in the counter of time 16, such trigger being the same trigger as operates flip-flop 616B of loran readout gate 24 in conjunction with the program gate. The purpose of the delay extender is for extending or continuing the main timer count while the main timer is reset, preset, and started again by a loran trigger pulse. In the example given, 5 milliseconds elapsed between the negative-going portion of the holdoff waveform (in FIG. 3) and time A at the end of a loran period.

The counter comprising decades 601–605 is preset in advance of receipt of each loran trigger input. Thus, the output of gate 617A is connected as an inverting input of gate 615A. Gate 615A operates one-shot multivibrator 614 energizing the "set" inputs of counters 601–605 whereby the loran rate is determined by the setting of switches 32 and 30, the counter being preset to count down the loran half-period interval.

For L basic rate settings of the switches, operation is substantially similar to that set out above except for the different timing brought about by the presetting for matching the L basic rate loran half-period. In the case of the L basic rate, the counter is preset to 80,000 for phase one operation. For the short count of phase two, the counter is preset to 80,000. In case of a basic S rate, operation is slightly different. It will be noted that gate 607A is enabled for either the H rate or the L rate, while gate 607A takes its place in the case where switch 32 is switched to the S rate. In the case of the S basic rate, the loran half-period is 25,000 microseconds, with the timer counter being preset to 75,000 microsecondo for phase one operation. Flip-flop 613B provides a Q output as an input to gate 608A for inhibiting pulses from amplifier 609D from ending the holdoff, when the counter reaches a count of 80,000. Only after the first output from amplifier 609D does the flip-flop 613 change states enabling gate 608A. An output for causing holdoff flip-flop 613A to change states will then occur when the counter reaches a count of 90,000, or 10 milliseconds before the loran half-period at A/2.

In phase two, with a basic S rate, gate 612A will be operated after 10,000 microseconds, when flip-flop 613A is changed in state for starting the holdoff. One-shot multivibrator 614 will be triggered, resetting flip-flop 613B. For phase two in the S basic rate, the counter is preset to 75,008. Flip-flop 613B will then operate as before whereby gate 608A is essentially disabled for the next output of amplifier 609D. Then, the subsequent output of amplifier 609D, occurring slightly before time A, will be permitted to switch phase control flip-flop 616A via gate 612B and gate 612C.

In the case of various specific loran rates chosen by switch 30, it will be seen that additional presetting is provided to the counters in each of the main and complement channels, whereby the loran half-period will be slightly shorter in accordance with the specific rate chosen.

As hereinbefore mentioned, the complement channel operates in a substantially similar manner to the main channel just described, but locks upon a different pulse of the pulse pair. In the illustrated embodiment, the complement holdoff of circuit 18' is not connected for inhibiting the main channel loran trigger gate.

Figure 4C:
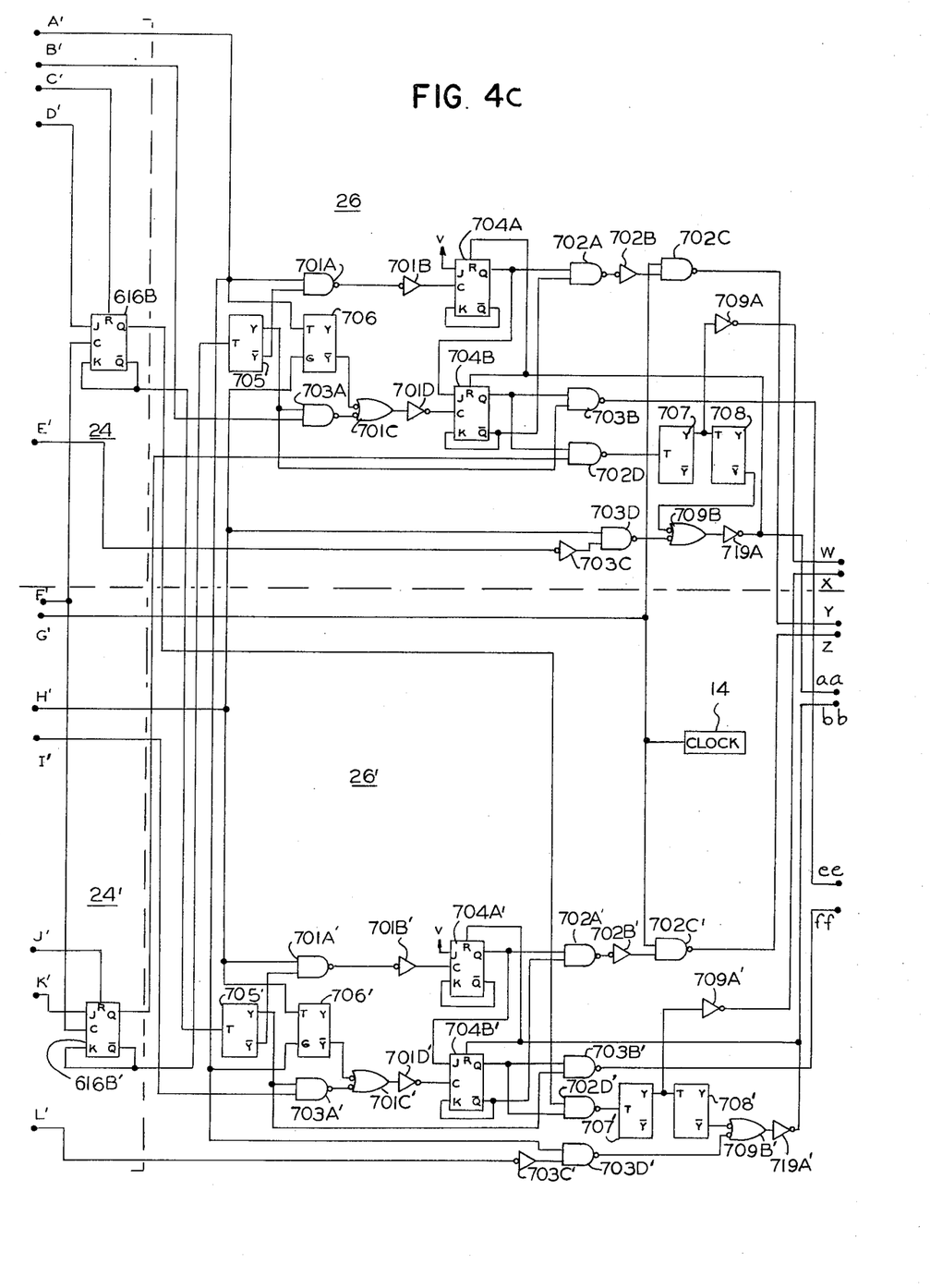

Referring now particularly to FIG. 4c, sequencers 26 and 26', together with loran readout gates 24 and 24' are illustrated in schematic diagram form. Again, the main channel circuitry will be particularly described, it being understood that the complement channel operates in s substantially similar manner, The sequencer 26 is adapted to provide a stream of clock pulses to the measurement and readout circuitry 28 (in FIG. 4d), indicative either of the time period $t_1$ in FIG. 2 or the time period $t_2$ in FIG. 3. Let us first consider the FIG. 2 situation. Thus, it is assumed the master signal has triggered the main channel timer and the slave signal has triggered the complement channel timer, and that lock-on has been established. The main timer phase control flip-flop 616A is toggled at A/2 whereby the $\overline{Q}$ output thereof goes low. This $\overline{Q}$ is applied as one input in nand-gate 701A and as well the trigger input to one-sort multivibrator 706, but the output of one-shot multivibrator 706 will be inhibited at this time due to a low level on the gate input, G, from the complement phase control flip-flop 616A' $\overline{Q}$ terminal. Thus, the complement phase control flip-flop $\overline{Q}$ output is down at this time as illustrated in FIG. 2. Also, the $\overline{Y}$ output terminal of one-shot multivibrator 705 is high at this time inasmuch as the one-shot multivibrator 705 is not triggered. Since the $\overline{Y}$ output of one-shot multivibrator 705 is connected as the remaining input of nand-gate 701A, "start" readout flip-flop 704A will be triggered via inverting amplifier 701B when the main phase control $\overline{Q}$ signal goes low at A/2. The $\overline{Q}$ output of flip-flop 704A is connected to its K input, whereby flip-flop 704A will remain in its toggled state until reset. Flip-flop 704A will provide its Q output via gate 702A and amplifier 702B for enabling nand-gate 702C which receives the output of clock pulse generator 14 as an additional input. Consequently, clock pulses are supplied to nor-gate 701A (in FIG. 4d) via terminals Y-Y' for operating the measurement and readout circuitry. It will be noted the Q output of flip-flop 704A is connected as the J input of "stop" readout flip-flop 704B.

Now at the time when the complement phase control flip-flop 616A' $\overline{Q}$ output goes up (substantially at the end of an A period for the complement timer), the loran gate flip-flop 616B' in loran trigger gate 12' will provide a low-to-high transsistion at its $\overline{Q}$ output. This is at the reset time for the delay extender in reset circuit 22'. Within a few microseconds the slave trigger signal will pass the program gate provided by loran readout gate 24', and the $\overline{Q}$ output of loran readout gate flip-flop 616B' will make a high-to-low transition. This transistion will trigger one-shot multivibrator 705 causing the same to provide an output pulse at its output terminal Y. The nand-gate 703A receives one of its inputs from the Y output of one-shot multivibrator 705, and receives its second input from the Q output of main phase control flip-flop 616A, which is high in level at this time. Therefore, one-shot multivibrator 705 will operate nand-gate 703A supplying an input to nor-gate 701C for toggling stop readout flip-flop 704B via inverting amplifier 701D, it being noted that a J input is provided flip-flop 704B as previously mentioned. The high-to-low transition then generated at the $\overline{Q}$ output of flip-flop 704B causes gate 702 to be disabled, in turn disabling nand-gate 702C via amplifier 702B. Therefore, the stream of clock pulses applied gate 701A will be inhibited at this time. It is seen the stream of clock pulses transmitted for measurement and counting in measurement and readout circuitry 28 has a duration corresponding to the time $t_1$ in FIG. 2.

The Q output of stop readout flip-flop 704B provides one input to each of nand-gates 703B and 702D. The Y output from multivibrator 705 also provides an input to nand-gate 703B, so upon the low-to-high level transition of the Q output of flip-flop 704B, nand-gate 703B in effect inverts the pulse from the Y terminal of multivibrator 705 for signifying that the master pulse is locked in the main channel and a slave pulse is locked in the complement channel. Such an indication is provided at terminal *ee*. Nand-gate 702D receives the stop readout indication at the Q terminal of flip-flop 704B, as well as the lock-on indication from the Q terminal of flip-flop 616B' and operates one-shot multivibrator 707, causing the same to provide a ½ microsecond duration pulse output as an update command via inverting amplifier 709A for latch strobing in measurement and readout circuitry 28 via terminals W and W' and gate 719B. This occurs when the stream of pulses via gate 702C has been discontinued. The strobe signal causes the display of the numerical total of the clock pulses counted in measurement and readout circuitry 28. The output of multivibrator 707 is further supplied to multivibrator 708, the $\overline{Y}$ output of which is coupled via nor-gate 709B and amplifier 719A to an input of gate 719C via terminals AA and AA'. This signal resets the readout counter in measurement and readout circuitry 28, and further resets start and stop flip-flops 704A and 704B. If gate 702D cannot provide an output for resetting due to a lack of complement signal lock-on, i.e. because of lack of an input from flip-flop 616B', the main timer reset output from gate 617A will supply an input to gate 709B for resetting the counter to zero. This input to gate 709B is provided via inverting amplifier 703C and nand-gate 703D, the latter receiving a second input from the $\overline{Q}$ terminal of complement phase control flip-flop 616A'. The displayed number will be held in the measurement and readout circuitry 28 until updated through one of the sequences described.

Alternatively, sequencer 26 may operate for supplying the stream of pulses for the period $t_2$ illustrated in FIG. 3. This assumes the slave signal has triggered the main timer and the master signal has triggered the complement timer, and that lock-on has been established. It is noted the complement timer can establish lock-on during the "up" period of the holdoff signal shown in FIG. 3. When a master pulse operates gate 24', its $\overline{Q}$ output, applied at the input of one-shot multivibrator 705, causes the latter to produce a $\overline{Y}$ output pulse coupled to nand-gate 701A. The other input of nand-gate 701A is high at this time, since it is derived from the $\overline{Q}$ output of main timer phase control flip-flop 616A, during phase one of the main timer. Thus the negative pulse output at the $\overline{Y}$ terminal of one-shot 705 is applied via gate 701A and amplifier 701B to the clock input of start readout flip-flop 704A. The start readout flip-flop 704A initiates a stream of clock pulses at the output of nand-gate 702C as hereinbefore described. When the main timer phase one ends, the high-to-low transition at the trigger input of one-shot multivibrator 706 causes a $\overline{Y}$ pulse output to be produced. It will be noted the G input of multivibrator 706 is high at this time, since it is coupled to the $\overline{Q}$ output of complement phase control flip-flop 616A'. The stop readout flip-flop 704B is then actuated at time A/2 and the stream of clock pulses from the gate 702C will be interrupted as before. Gate 703B is not actuated at this time since no pulse is applied from one-shot 705, and the absence of output from gate 703B at terminal *ee* is indicative of the fact that the main timer is locked on the slave pulse. (Also, gate 703B' will produce an output at terminal *ff*.) Gate 702D, one-shot 707, one shot 708, nor-gate 709B, and inverting amplifier 719A operate as previously described.

The double readout mode is made possible through utilization of the complement sequencer 26'. Let us assume the FIG. 2 situation, wherein the main timer is locked upon the master pulse and the complement timer is locked upon the slave pulse. Therefore, gate 702C is producing a series of clock pulses related to the time $t_1$ in FIG. 2. The complement sequencer will now provide a series of clock pulses related to the timer $t_4$ in FIG. 2. The inputs to the complement sequencer gates 701A' and 703A' are provided by the complement timer phase control flip-flop 616A' $\overline{Q}$ and Q outputs, respectively. The input of one-shot multivibrator 705' is taken from the main channel loran readout gate flip-flop 616B Q terminal, while the Q terminal of flip-flop 616B is the source of the input level for one terminal of gate 702D' in the complement sequencer circuit. The gating input of one-shot multivibrator 706' is provided from the $\overline{Q}$ output of main timer phase control flip-flop 616A, which also supplies an input to gate 703D'. When a master pulse operates loran readout gate 24, the $\overline{Q}$ output thereof triggers one-shot multivibrator 705', the latter supplying its $\overline{Y}$ output to nand-gate 701A'. Since the remaining input to gate 701A' is up during the $t_4$ interval, gate 701A' will be energized and complement start readout flip-flop 704A' will be toggled. In response thereto, a series of clock pulses will be enabled via nand-gate 702C' in the same manner as was described in connection with the main sequencer. Subsequently, the complement timer phase one ends at A'/2, i.e., when complement timer phase control flip-flop 616A' produces a negative-going transistion at its $\overline{Q}$ output terminal. This transition triggers one-shot multivibrator 706', the gate terminal of which is up at this time since it is coupled to the $\overline{Q}$ terminal of the main timer phase control flip-flop 616A. The $\overline{Y}$ output of one-shot multivibrator 706' toggles stop readout flip-flop 704B' via gate 701C' and amplifier 701D', and the $\overline{Q}$ output of flip-flop 704B' concludes the series of pulses delivered by gate 702C'. Consequently, the additional series of pulses at $t_4$ will be applied to the measurement and readout circuitry 28, alternating with the series of pulses supplied at $t_1$, bringing about additional valid inputs per unit of time for measurement.

Alternatively, let it be assumed that the main timer has locked on to the slave pulse and the complement timer has locked on to the master pulse, whereby the situation of FIG. 3 obtains and gate 702C is providing a series of output pulses at time $t_2$. Then, the complement sequencer is adapted to provide a second series of pulses at time $t_3$. Thus, the complement timer phase control flip-flop 616A' is toggled at A'/2 in FIG. 3 and the $\overline{Q}$ output thereof is applied as one input to nand-gate 701A'. The Y' output terminal of one-shot multivibrator 705' is high at this time, and consequently nand-gate 701A' is effective in toggling start readout flip-flop 704A'. Therefore, a series of pulses will be delivered from gate 702C'. Subsequently, the loran readout gate 24 will supply an output as a slave pulse passes through the gate, i.e., at time A in FIG. 3. Consequently, one-shot multivibrator 705' will provide a pulse at its Y terminal for operating nand-gate 703A' in conjunction with an input derived from the Q terminal of complement timer phase control flip-flop 616A' which is up at this time. The output of gate 703A' toggles stop readout flip-flop 704B' via gate 701C' and amplifier 701D', and a $\overline{Q}$ output of flip-flop 704B' stops the series of pulses delivered via gate 702C'. Therefore, the additional complement sequencer output is provided regardless of which channel is locked to the master pulse and which is locked to the slave pulse. In other respects, the complement sequence circuitry 26' operates in substantially the same manner as described for the main sequencer 26.

To assure that the counter in the measurement and readout circuitry 28 is reset to zero at the proper time, the following reset functions are carried out. When the master pulse is triggering the main timer, the reset to the measurement and readout circuitry 28 via gate 709B will be alternatively enabled from gate 617A as hereinbefore described. However, no reset pulse from gate 617A' will be applied to gate 709B', since the $\overline{Q}$ output from the main phase control flip-flop is applied to gate 703D'. This will prevent an improper reset when the measurement and readout circuitry is being clocked. When the slave pulse is in the main timer, the opposite situation obtains, and the alternative reset for the main sequencer is inhibited. It will be noted that reset, when proper lock-on has occurred, will be derived from one-shot multivibrators 708 and 708'. Reset occurs in the measurement and readout circuitry after every update or strobe command, and at the end of either the main or complement timer cycle when readout entry is not being made.

Figure 4D:
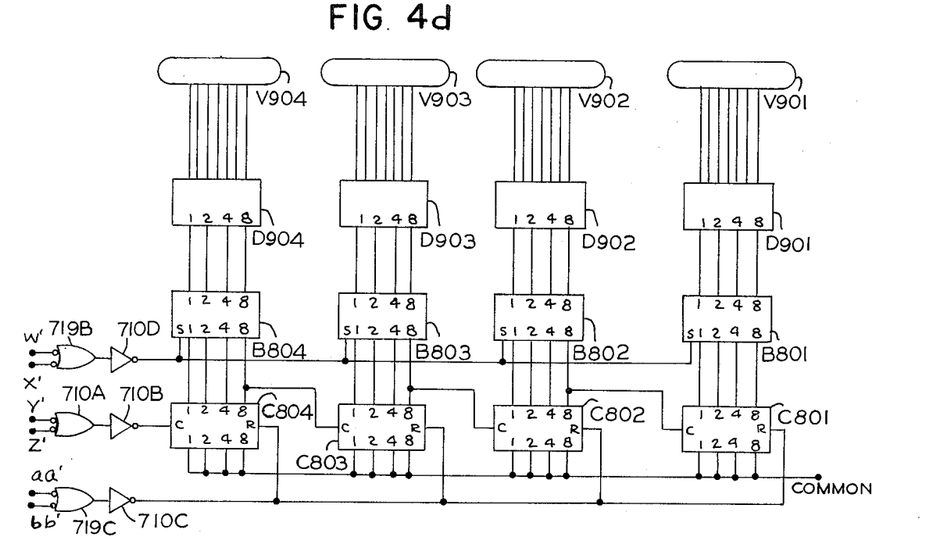

Referring to FIG. 4d, illustrating measurement and readout circuitry 28 in schematic diagram form, such circuitry includes a counter comprising decades C804, C803, C802 and C801. The decades provide a binary coded decimal output to buffer memories B804, B803, B802 and B801, respectively, for application to display means V904, V903, V902 and V901 via decoder drivers D904, D903, D902 and D901. The display means are suitably commonly used light- emitting displays which each provide seven horizontal and vertical light-emitting segments responsive to seven inputs and which would, if all energized, provide a visible representation of the numeral 8 in block style.

The streams of clock pulses are received from gate 701A via amplifier 701B and applied to the counting input of lowest order counter decade, C804. The decades are each arranged to count in decimal fashion, and when the eight output of decade C804 drops, a carry input is applied to decade C803 and so on. When a latch strobe or update input is received from gate 719B at each of the buffer memory stages, the counter contents are shifted into the buffer memory. The buffer memory outputs are coupled to the decoder drivers which translate the BCD digit in each case to the segmental numeral output, the complete display providing the last four digits of the loran line of position. Of course, when a reset input is received, from gate 719C by way of inverting amplifier 710C, the counter decades are all reset to zero. However, the buffer memory holds the previous input for display. It will be seen, however, that a double rate output is supplied since counting inputs are received from both inputs of gate 710A, and the output display is updated twice during each loran period via the two inputs of gate 179B.

Figure 5:
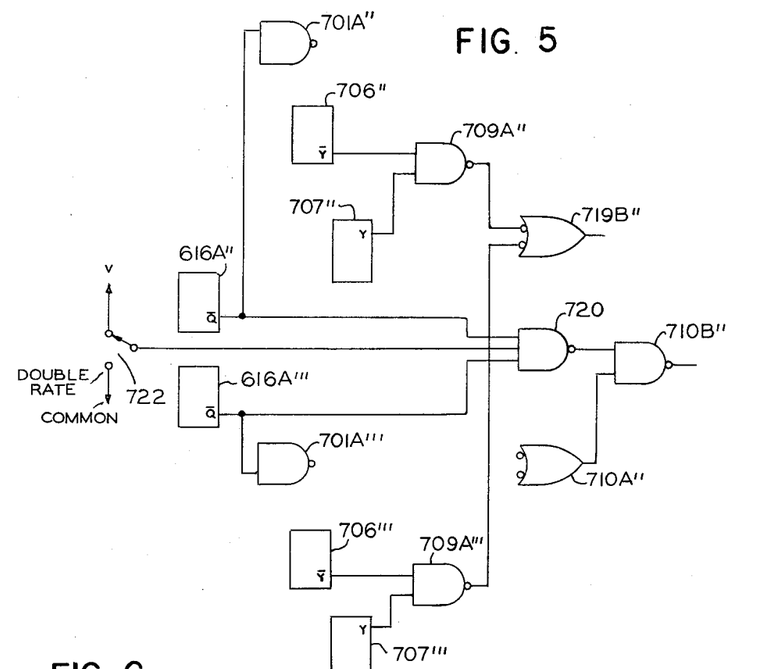
FIG. 5 is a schematic diagram illustrating a first alternative embodiment of the present invention.

Referring to FIG. 5, a modification of the circuit of the present invention is illustrated for effectively bringing about measurement only from the half-period marker pulse associated with the master pulse of the loran pair to the time of the slave pulse, this type of measurement being desirable for some purposes. In this case, switch 722 is in its upper position supplying a positive voltage as an input to nand-gate 720. The remaining reference numerals in FIG. 5 correspond in general to those found in FIGS. 4c and 4d and refer to similar elements, except in the main channel elements are referred to employing double primed reference numerals, while complement channel elements are referred to employing triple primed reference numerals. In addition, inverting amplifier 710B in FIG. 4d is replaced by nand-gate 710B'', whereby high inputs from both gates 710A'' and 720 are necessary to supply an output for clocking counter decade C804. Also elements 709A are gates receiving the indicated inputs from flip-flops 706 and 707 in each case. It will be seen that gate 720 is enabled by the Q outputs of main phase control flip-flops 616A'' and 616A''' only during the time periods $t_4$ and $t_2$ in FIGS. 2 and 3. Gate 710B'' will be inhibited from providing an output of clock pulses from gate 710A'' during periods $t_2$ and $t_4$ and, consequently, the loran measurement is provided only from the half-period marker pulse associated with the master pulse of the loran pair to the time of the slave pulse of the loran pair, i.e., during time periods $t_1$ and $t_3$. The flow of clock pulses for measurement is inhibited during the overlap of phase one for the main channel timer and phase one for the complement channel timer. Clearly, if the Q outputs of flip-flops 616A'' and 616A''' were employed instead of the $\overline{Q}$ outputs, the time periods $t_2$ and $t_4$ would be selected. In any case, when switch 722 is thrown to its lower position, connecting the middle input of gate 720 to a common return, gate 720 will never supply a negative or inhibiting output, and therefore a double rate output will be produced by the system for the last mentioned switching position.

Figure 6:
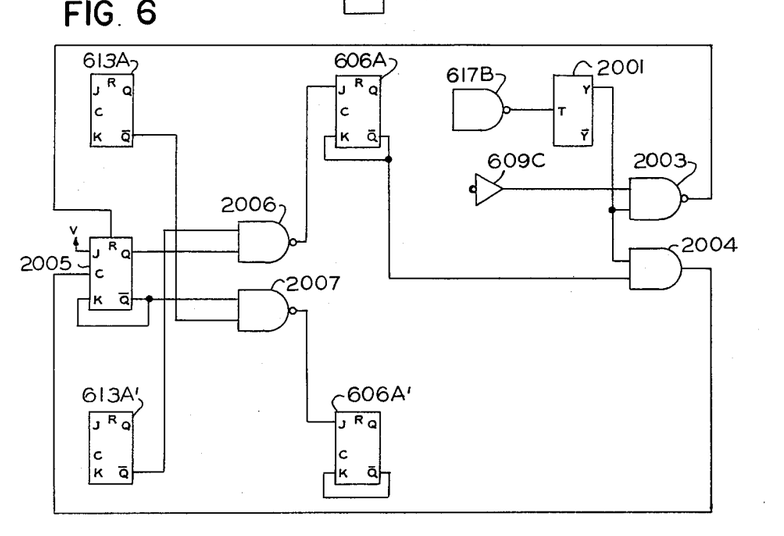
FIG. 6 is a schematic diagram illustrating a second alternative embodiment of the present invention.

A further modification of the circuit according to the present invention is illustrated in FIG. 6. This circuit employs a holdoff output from holdoff flip-flop 613A' in the complement channel as well as a holdoff output from holdoff flip-flop 613A in the main channel, and as a result the circuitry attains the advantage of improved reliability of operation. The purpose of the circuit is to permit complement timer channel operation which is uninterrupted in the event of loss of proper triggering of the main timer channel. Thus, let us assume the main timer channel loses triggering due to signal fading or the like. The output will, of course, be temporarily lost, but the main channel will subsequently lock on a pulse input trigger having the proper repetition rate. If lock-on is produced with respect to the same input trigger pulse to which the main channel was formerly locked, normal operations will resume. However, if the main channel locks on to the trigger pulse to which the complement channel was locked, or produces timing from a similarly located pulse, the main channel holdoff will inhibit complement channel operation, forcing the complement channel out of a locked condition until it can seek and lock on to the remaining input trigger. To prevent this chain of events, the FIG. 6 circuit can be employed. The elements of FIG. 6 are referred to employing the same reference numerals found in FIGS. 4a and 4b and additional components are referred to employing reference numerals mentioned below.

In the event the main timer operation continues at the proper rate, and the complement timer fails to continue operation, the system operation will proceed as orginally described until complement lock-on at a proper rate is achieved. Assuming normal operation during the main channel timer cycle, holdoff steering flip-flop 2005 is in its reset state, i.e., its Q output terminal is low, as will be seen from the following. The reset for flip-flop 2005 is provided from nand-gate 2003 and ultimately from nand-gate 617B via one-shot multivibrator 2001. As will be recalled from FIG. 4a, nand-gate 617B provides the resetting output for the delay extender, i.e., it resets flip-flop 606B. Assuming proper rate lock-on, the delay extender action is then terminated. The output of gate 617B is applied to trigger the input of one-shot multivibrator 2001, and the output of one-shot multivibrator 2001 is a 20-microsecond duration gate. Since the main channel timer is assumed to be properly triggered, the 10-microsecond count from inverter 609C in timer 16 falls within the 20-microsecond period of the output of one-shot multivibrator 2001 and gate 2003 is energized for resetting flip-flop 2005. With the Q output of flip-flop 2005 thus low, nand-gate 2006 holds the J input of flip-flop 606A high, enabling the loran trigger gate 12 of which flip-flop 606A is part. Similarly, the $\bar{Q}$ output of flip-flop 2005 will be up, allowing the output from holdoff flip-flop 613A to be applied to flip-flop 606A' as detailed in the original discussion.

However, assuming that no proper rate triggering occurs in the main channel, but events as described through the timing of the delay extender reset have all taken place, the one-shot multivibrator 2001 will be triggered by the output of gate 617B, but there will be no output from gate 609C within the 20-microsecond period of the output of one-shot multivibrator 2001. Also, since the main channel flip-flop 606A is not clocked, the $\bar{Q}$ output thereof is high, enabling gate 2004. Gate 2004 produces a low-to-high level pulse 20 microseconds in duration, and the high-to-low level transition at the termination of the 20-microsecond period is applied as a clock input to flip-flop 2005. The flip-flop 2005 will produce a Q output which will now be high, enabling nand-gate 2006, and since the complement channel timer is assumed to be locked on at this time, the complement channel will be providing a holdoff pulse. Consequently, the main timer channel will be held off, that is, prevented from locking on to the pulse to which the complement channel is locked.

The holdoff conditions are thus reversed and the main timer gating produced by flip-flop 606A is controlled by the holdoff generator in the complement channel.

Upon establishment of the proper triggering of the main channel, the initial circumstances of main channel control will be reinstated. Until such reinstatement, the control of the holdoff by the complement channel will take place unless it, too, loses proper lock-on, or until the main channel regains lock-on. If both channels are searching, independent of each other, they will continue to transfer holdoff control without effect on lock-on by either.

In accordance with the principal embodiment of the present invention, measurement is continuously and alternately made from loran half-period marker associated with one pulse of a loran pair to the remaining pulse of a loran pair. Thus, measurement is made from the loran half-period marker associated with the master pulse to the time of the slave pulse, followed by measurement of the time from the half-period marker associated with the slave pulse to the time of the master pulse, with the two measurements alternating to provide information at a more rapid rate than heretofore supplied. Alternatively, the system may be arranged for always measuring from the half-period marker pulse associated with one pulse of the loran pair to the time of the remaining pulse. In either case, an automatic output is supplied and no manual or initial selection of the master and slave pulses is required in operation of the apparatus.

While I have shown and described several preferred embodiments of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. A pulsed hyperbolic receiving system for deriving position information from a pair of received pulse signals transmitted from separated locations at a given repetition rate, according to the position of the receiving location with respect to the separated transmitting locations of said signal pair, said system comprising:
    radio receiving means for receiving said pulse signals and for generating signals corresponding to the half-period times of each of said received pulse signals,
    means for repetitively measuring the time period between reception of a first of said signals and the half-period time of the second of said signals,
    and means for repetitively measuring the time period between reception of the second of said signals and the half-period time of the first of said signals at times between the first mentioned repetitive measurements to supply outputs related to the delay between the reception of the first and second pulse signals twice during each pulse period at the given repetition rate.

2. A pulsed hyperbolic receiving system for deriving position information from pairs of received signals transmitted from separated locations at given repetition rates, according to the position of the receiving location with respect to the separated transmitting locations of said signal pairs, said system comprising:
    radio receiving means for receiving said signals, means for selecting signal pairs according to the repetition rate thereof, and for providing marker signals after half the period of recurrence of each of said signals, and means for measuring the time periods between each of the signals of a pair and the marker signal one half-period after the other signal.

3. A pulsed hyperbolic receiving system for deriving position information from a pair of received signals transmitted from separated locations at a given repetition rate, according to the position of the receiving location with respect to the separated transmitting locations of said signal pair, said system comprising:

means for generating a first marker signal substantially one-half pulse period after a first of said signals, means for generating a second marker signal substantially one-half pulse period after the second of said signals, and means for measuring the period from a said marker signal to the received signal which occurs within predetermined time limits and in predetermined order with respect to the last mentioned marker signal.

4. The system according to claim 3 wherein said marker signal divides the pulse period of the respective signals into a first phase and a second phase and wherein said measurement is accomplished in a given phase for each pulse period.

5. A method for measuring the timing between signal pairs periodically received from a pulsed hyperbolic navigational transmission system, said signal pairs each comprising a master pulse and a slave pulse, said method comprising:

receiving said signals, selecting a predetermined pair of repetitive signals according to the frequency of transmission and repetition rate thereof, and consecutively measuring the elapsed time between the half-period point for each of said signals and the time of the remaining signal to provide an output indication responsive to both the time from the half-period point of the master pulse period to the slave pulse, and the time from the half-period point of the slave pulse period to the master pulse.

6. The method for measuring the timing between signals periodically received from a pulsed hyperbolic navigational transmission system, said method comprising:

generating a first marker signal substantially one-half pulse period after the second of said signals, and measuring the period from one of said marker signals to the received signal which occurs within predetermined time limits and in predetermined order with respect to the last mentioned signal.

7. A pulsed hyperbolic receiving system for deriving position information from pairs of received signals transmitted from separate locations at given repetition rates, according to the position of the receiving location with respect to the separated transmitting locations of said signal pairs, said system comprising:

a main channel circuit for receiving a first input signal of a pair, said main channel circuit including timing means for measuring the period of time corresponding to the given repetition rate and for producing a first gating signal substantially at the end of said period while enabling said channel circuit to be actuated by a succeeding pulse of the same repetition rate, a complement channel circuit for receiving a second input signal of a pair, said complement channel circuit including timing means for measuring the period of time corresponding to the given repetition rate and for producing a second gating signal substantially at the end of the last mentioned period while enabling said complement channel circuit to be actuated by a succeeding pulse of the same repetition rate, holdoff means operated by said main channel circuit for inhibiting triggering of said complement channel by the same input signal, a first sequencer means adapted to deliver a series of clock pulses starting either with an input signal enabled by said first gating signal and concluded by the half-period point between input signals in the main channel circuit as determined by the timing means of said main channel circuit, or vice versa, second sequencer means adapted to deliver a series of clock pulses starting either with an input signal enabled by said second gating signal and concluded by the half-period point between input signals in the complement channel circuit as determined by the timing means of the complement channel circuit, or vice versa, and measurement and readout means adapted to receive outputs of both said sequencer means for providing a double measurement of line-of-position information during each loran period by counting said clock pulses.

8. The apparatus according to claim 7 further including second holdoff means responsive to the operation of said complement channel circuit for inhibiting the main channel circuit from responding to the same input signal to which the complement channel circuit responds, and means for enabling said second holdoff means and disabling the first mentioned holdoff means when the main channel circuit is not triggered by an input signal.

9. The system according to claim 7 further including means for selectively inhibiting the stream of clock pulses produced by said sequencer means during a selected part of the period for each of said timing means for the main and complement channel circuits for producing measurement of elapsed time between the half-period point of a given input and the occurrence of the remaining input in predetermined order with respect to the said half-period point.

10. The circuit according to claim 9 including switching means for alternatively selecting double or single rate readout by enabling or inhibiting said inhibiting means.

11. A pulsed hyperbolic receiving system for deriving position information from pairs of received signals transmitted from separate locations at given repetition rates, according to the position of the receiving location with respect to the separated transmitting locations of said signal pairs, said system comprising:

radio receiving means for receiving said signals, a main signal channel adapted to receive a given signal of a signal pair, and including timing means for enabling the channel to receive and be responsive to the next repetition of the same signal for effectively locking onto said signal, a complement signal channel adapted to receive the remaining signal of a signal pair, and including timing means for enabling the complement channel to receive and be responsive to the next repetition of said remaining signal for effectively locking onto the same, holdoff means responsive to the timing means of said main channel for inhibiting lock-on of the complement channel to the same input signal, second holdoff means responsive to timing means of the complement signal channel for preventing lock-on by the main channel to the signal to which the complement channel is locked, and means responsive to reception of the signal in the main channel for inhibiting the last mentioned holdoff means.

12. The system according to claim 11 wherein the means for inhibiting comprises a means for producing a gate responsive to a reset pulse produced by the timing means in the main signal channel and a given count in the main channel timing means, a flip-flop responsive to said gate for enabling the first mentioned holdoff means in the event such count occurs, and means responsive to the absence of main channel reception for clocking said flip-flop for enabling said second holdoff means during said gate.

* * * * *

UNITED STATES PATENT OFFICE
CERTIFICATE OF CORRECTION

Patent No. 3,806,933  Dated April 23, 1974

Inventor(s) Wayne E. DeVaul

It is certified that error appears in the above-identified patent and that said Letters Patent are hereby corrected as shown below:

Column 1, line 18, "of" should be --is--.
Column 1, line 22, "operations" should be --operation--.
Column 1, line 33, after "point" change "of" to --for--.
Column 2, line 47, "plate" should be --gate--.
Column 2, line 59, "2∩" should be --20--.
Column 2, line 66, "element" should be --elements--.
Column 4, line 63, at the end of the line "dicontinu-" should be --discontinu- --.
Column 5, line 28, "selected" should be --selection--.
Column 5, line 32, delete second occurrence of "is".
Column 5, line 37, at end of line, "she-" should be --sche- --.
Column 5, line 44, "plate" should be --gate--.
Column 5, line 47, "plate" should be --gate--.
Column 5, line 60, "stage" should be --state--.
Column 6, line 6, "storage" should be --stage--.
Column 6, line 14, "inputs" should be --outputs--.
Column 6, line 28, "HO" should be --HØ--.
Column 6, line 37, "plate" should be --gate--.
Column 6, line 52, "ciruit" should be --circuit--.
Column 6, line 64, before "flip-flop's" insert --the--.
Column 6, line 67, at the end of the line, change period to comma.
Column 7, line 28, "an" should be --and--.
Column 7, line 46, at beginning of the line "a" should be --the--
Column 7, line 54, at beginning of the line "the" should be --a--
Column 9, line 40, "80,000" should be --80,008--.
Column 9, line 46, "607A" should be --608A--.
Column 9, line 49, "microsecondo" should be --microseconds--.
Column 9, line 53, "613" should be --613B--.
Column 10, line 20, before "substantially" change "s" to --a--.
Column 10, line 32, before "multivibrator", "sort" should be --shot--
Column 10, line 51, "701A" should be --710A--.

UNITED STATES PATENT OFFICE
CERTIFICATE OF CORRECTION

Patent No. 3,806,933    Dated April 23, 1974

Inventor(s) Wayne E. DeVaul    Page - 2

It is certified that error appears in the above-identified patent and that said Letters Patent are hereby corrected as shown below:

Column 10, line 60, "transistion" should be --transition--.
Column 10, line 66, "transistion" should be --transition--.
Column 11, line 13, "701A" should be --710A--.
Column 12, line 31, "timer $t_4$" should be --time $t_4$--.
Column 12, line 37, "Q terminal" (first occurrence) should be --$\bar{Q}$ terminal--.
Column 12, line 55, at beginning of the line, "sistion" should be --sition--.
Column 14, line 17, "179B" should be --719B--.
Column 14, line 38, "Q" should be --$\bar{Q}$--.

In the claims:

Claim 6, lines 5-6,
  "generating a first marker signal substantially one-half pulse period after the second of said signals," should be
  --generating a first marker signal substantially one-half pulse period after a first of said signals, generating a second marker signal substantially one-half pulse period after the second of said signals,--.

Signed and sealed this 29th day of October 1974.

(SEAL)
Attest:

McCOY M. GIBSON JR.
Attesting Officer

C. MARSHALL DANN
Commissioner of Patents